(12) United States Patent
Gallagher et al.

(10) Patent No.: US 8,839,209 B2
(45) Date of Patent: Sep. 16, 2014

(54) SOFTWARE PERFORMANCE PROFILING IN A MULTI-TENANT ENVIRONMENT

(75) Inventors: William Gallagher, Howard, PA (US); Zuye Zheng, San Francisco, CA (US); Fiaz Hossain, San Francisco, CA (US); James Iry, Richmond, CA (US); Nagraj Kulkarni, Santa Clara, CA (US)

(73) Assignee: salesforce.com, inc., San Francisco, CA (US)

( * ) Notice: Subject to any disclaimer, the term of this patent is extended or adjusted under 35 U.S.C. 154(b) by 568 days.

(21) Appl. No.: 13/033,566

(22) Filed: Feb. 23, 2011

(65) Prior Publication Data

US 2011/0283266 A1 Nov. 17, 2011

Related U.S. Application Data

(60) Provisional application No. 61/395,376, filed on May 12, 2010.

(51) Int. Cl.
*G06F 9/44* (2006.01)

(52) U.S. Cl.
CPC ........................................ *G06F 9/44* (2013.01)
USPC .......................................................... 717/130

(58) Field of Classification Search
CPC .................................................. G06F 11/3644
USPC .......................................................... 717/130
See application file for complete search history.

(56) References Cited

U.S. PATENT DOCUMENTS

| | | | |
|---|---|---|---|
| 5,715,450 A | 2/1998 | Ambrose et al. |
| 5,821,937 A | 10/1998 | Tonelli et al. |
| 5,831,610 A | 11/1998 | Tonelli et al. |
| 5,873,096 A | 2/1999 | Lim et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,324,568 B1 | 11/2001 | Diec et al. |

(Continued)

FOREIGN PATENT DOCUMENTS

| | | |
|---|---|---|
| WO | WO/2007/030796 A2 | 3/2007 |
| WO | WO/2012/054309 A1 | 4/2012 |
| WO | WO/2013/025863 A2 | 2/2013 |
| WO | WO/2013/032764 A1 | 3/2013 |

*Primary Examiner* — Li B Zhen
*Assistant Examiner* — Lenin Paulino
(74) *Attorney, Agent, or Firm* — Ingrassia Fisher & Lorenz, P.C.

(57) ABSTRACT

A method for software performance analysis and debugging in a multi-tenant database network system is provided. In at least one embodiment, sampling is achieved using configuration files of each server cluster. Knowledge of the host names of each server in the cluster enables a profiler to target a single server for each sample, thereby facilitating a round-robin sample across a clustered server environment such that a CPU's load and processing cost associated to sampling is fairly and uniformly distributed across all servers in the cluster. As a result, in at least one embodiment of the analysis and debugging tool each sample is a complete stack trace dump of each thread running on the application server at that moment in time.

19 Claims, 9 Drawing Sheets

(56) References Cited

U.S. PATENT DOCUMENTS

| | | | |
|---|---|---|---|
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,490,611 B1* | 12/2002 | Shen et al. | 718/103 |
| 6,549,908 B1 | 4/2003 | Loomans | |
| 6,553,563 B2 | 4/2003 | Ambrose et al. | |
| 6,574,635 B2 | 6/2003 | Stauber et al. | |
| 6,577,726 B1 | 6/2003 | Huang et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,356,482 B2 | 4/2008 | Frankland et al. | |
| 7,516,191 B2 | 4/2009 | Brouk et al. | |
| 7,689,711 B2 | 3/2010 | Brouk et al. | |
| 7,788,399 B2 | 8/2010 | Brouk et al. | |
| 7,949,684 B2 | 5/2011 | Brooks et al. | |
| 8,015,495 B2 | 9/2011 | Achacoso et al. | |
| 8,234,290 B2 | 7/2012 | Hofhansi et al. | |
| 8,244,759 B2 | 8/2012 | Brooks et al. | |
| 8,255,566 B2 | 8/2012 | Brouk et al. | |
| 8,296,161 B2 | 10/2012 | Polcari et al. | |
| 8,321,405 B2 | 11/2012 | Weissman et al. | |
| 8,386,471 B2 | 2/2013 | Collins et al. | |
| 8,412,178 B2 | 4/2013 | Schilling | |
| 8,429,011 B2 | 4/2013 | Newton et al. | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0033400 A1* | 2/2003 | Pawar et al. | 709/223 |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0167273 A1* | 9/2003 | Alexander et al. | 707/100 |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0218543 A1* | 9/2006 | Boger | 717/157 |
| 2006/0224375 A1* | 10/2006 | Barnett et al. | 703/22 |
| 2007/0088741 A1 | 4/2007 | Brooks et al. | |
| 2007/0106674 A1* | 5/2007 | Agrawal et al. | 707/10 |
| 2008/0047010 A1* | 2/2008 | Marceau | 726/23 |
| 2008/0244546 A1* | 10/2008 | Schmelter et al. | 717/158 |
| 2010/0070323 A1 | 3/2010 | Polcari et al. | |
| 2010/0114912 A1 | 5/2010 | Hofhansl et al. | |
| 2010/0223284 A1 | 9/2010 | Brooks et al. | |
| 2010/0235495 A1 | 9/2010 | Petersen et al. | |
| 2010/0306536 A1 | 12/2010 | Brouk et al. | |
| 2011/0083122 A1 | 4/2011 | Chen et al. | |
| 2011/0196883 A1 | 8/2011 | Brooks et al. | |
| 2011/0202508 A1 | 8/2011 | Brooks et al. | |
| 2011/0202911 A1 | 8/2011 | Brooks et al. | |
| 2011/0208858 A1 | 8/2011 | Yancey et al. | |
| 2011/0214067 A1 | 9/2011 | Tanaka | |
| 2011/0231457 A1 | 9/2011 | Tager et al. | |
| 2011/0246417 A1 | 10/2011 | Maya et al. | |
| 2011/0246434 A1 | 10/2011 | Cheenath et al. | |
| 2011/0246527 A1 | 10/2011 | Bitting et al. | |
| 2011/0246544 A1 | 10/2011 | Davis | |
| 2011/0258233 A1 | 10/2011 | Unger et al. | |
| 2011/0258612 A1 | 10/2011 | Matthiesen et al. | |
| 2011/0258614 A1 | 10/2011 | Tamm | |
| 2011/0258630 A1 | 10/2011 | Fee et al. | |
| 2011/0264434 A1 | 10/2011 | Jain et al. | |
| 2011/0264650 A1 | 10/2011 | Tobin et al. | |
| 2011/0264861 A1 | 10/2011 | Fee et al. | |
| 2011/0265066 A1 | 10/2011 | Fee et al. | |
| 2011/0265069 A1 | 10/2011 | Fee et al. | |
| 2011/0270885 A1 | 11/2011 | Vieira et al. | |
| 2011/0276610 A1 | 11/2011 | Hossain et al. | |
| 2011/0276945 A1 | 11/2011 | Chasman et al. | |
| 2011/0282872 A1 | 11/2011 | Oksman et al. | |
| 2011/0282881 A1 | 11/2011 | Collins et al. | |
| 2011/0282899 A1 | 11/2011 | Mathew et al. | |
| 2011/0283163 A1 | 11/2011 | Zheng | |
| 2011/0283266 A1 | 11/2011 | Gallagher et al. | |
| 2011/0289140 A1 | 11/2011 | Pletter et al. | |
| 2011/0289141 A1 | 11/2011 | Pletter et al. | |
| 2011/0289356 A1 | 11/2011 | Hossain et al. | |
| 2011/0289425 A1 | 11/2011 | Pletter et al. | |
| 2011/0289476 A1 | 11/2011 | Pletter et al. | |
| 2011/0289479 A1 | 11/2011 | Pletter et al. | |
| 2011/0296375 A1 | 12/2011 | Mooney | |
| 2011/0296381 A1 | 12/2011 | Mooney | |
| 2011/0302221 A1 | 12/2011 | Tobin et al. | |

(56) References Cited

U.S. PATENT DOCUMENTS

| | | |
|---|---|---|
| 2011/0302631 A1 | 12/2011 | Sureshchandra et al. |
| 2011/0320955 A1 | 12/2011 | O'Connor |
| 2011/0321175 A1 | 12/2011 | Slater |
| 2012/0005537 A1 | 1/2012 | Chen et al. |
| 2012/0016913 A1 | 1/2012 | Tamm et al. |
| 2012/0023107 A1 | 1/2012 | Nachnani et al. |
| 2012/0042210 A1 | 2/2012 | Glaser et al. |
| 2012/0047489 A1 | 2/2012 | Varadharajan |
| 2012/0054241 A1 | 3/2012 | Brooks et al. |
| 2012/0054328 A1 | 3/2012 | Brooks et al. |
| 2012/0059807 A1 | 3/2012 | Brooks et al. |
| 2012/0059862 A1 | 3/2012 | Brooks et al. |
| 2012/0066755 A1 | 3/2012 | Peddada |
| 2012/0079038 A1 | 3/2012 | Hersh |
| 2012/0084266 A1 | 4/2012 | Brooks et al. |
| 2012/0084638 A1 | 4/2012 | Calvin et al. |
| 2012/0096046 A1 | 4/2012 | Kucera |
| 2012/0096521 A1 | 4/2012 | Peddada |
| 2012/0102114 A1 | 4/2012 | Dunn et al. |
| 2012/0102402 A1 | 4/2012 | Kwong |
| 2012/0130910 A1 | 5/2012 | Al-Alami |
| 2012/0131555 A1 | 5/2012 | Hossain et al. |
| 2012/0136602 A1 | 5/2012 | Hossain et al. |
| 2012/0144332 A1 | 6/2012 | Sola |
| 2012/0144374 A1 | 6/2012 | Gallagher et al. |
| 2012/0151063 A1 | 6/2012 | Yang et al. |
| 2012/0158834 A1 | 6/2012 | Brouk et al. |
| 2012/0158835 A1 | 6/2012 | Brouk et al. |
| 2012/0179762 A1 | 7/2012 | Arora et al. |
| 2012/0190432 A1 | 7/2012 | Nathanson |
| 2012/0209702 A1 | 8/2012 | Newton et al. |
| 2012/0233191 A1 | 9/2012 | Ramanujam |
| 2012/0233212 A1 | 9/2012 | Newton et al. |
| 2012/0239629 A1 | 9/2012 | Brooks et al. |
| 2012/0246120 A1 | 9/2012 | Brooks et al. |
| 2012/0317146 A1 | 12/2012 | Brooks et al. |
| 2012/0317238 A1 | 12/2012 | Beard |
| 2012/0324125 A1 | 12/2012 | Brouk et al. |
| 2012/0330913 A1 | 12/2012 | Devadhar |
| 2012/0331016 A1 | 12/2012 | Janson et al. |
| 2012/0331053 A1 | 12/2012 | Dunn |
| 2013/0007029 A1 | 1/2013 | Ziemann |
| 2013/0007148 A1 | 1/2013 | Olsen |
| 2013/0013577 A1 | 1/2013 | Fee et al. |
| 2013/0018869 A1 | 1/2013 | Hanson et al. |
| 2013/0018890 A1 | 1/2013 | Rajan et al. |
| 2013/0018955 A1 | 1/2013 | Thaxton et al. |
| 2013/0018956 A1 | 1/2013 | McConnell et al. |
| 2013/0018958 A1 | 1/2013 | McConnell et al. |
| 2013/0021370 A1 | 1/2013 | Dunn et al. |
| 2013/0024454 A1 | 1/2013 | Dunn |
| 2013/0024511 A1 | 1/2013 | Dunn et al. |
| 2013/0024788 A1 | 1/2013 | Olsen et al. |
| 2013/0024795 A1 | 1/2013 | Robotham et al. |
| 2013/0024843 A1 | 1/2013 | Kutlu |
| 2013/0024910 A1 | 1/2013 | Verma et al. |
| 2013/0031053 A1 | 1/2013 | Tobin et al. |
| 2013/0031054 A1 | 1/2013 | Tobin et al. |
| 2013/0031061 A1 | 1/2013 | Jagota |
| 2013/0031141 A1 | 1/2013 | Tobin et al. |
| 2013/0031172 A1 | 1/2013 | Olsen et al. |
| 2013/0031487 A1 | 1/2013 | Olsen et al. |
| 2013/0031491 A1 | 1/2013 | Tobin et al. |
| 2013/0031555 A1 | 1/2013 | Tobin et al. |
| 2013/0036406 A1 | 2/2013 | Zheng et al. |
| 2013/0036407 A1 | 2/2013 | Zheng et al. |
| 2013/0046549 A1 | 2/2013 | Colby et al. |
| 2013/0046789 A1 | 2/2013 | Lulewicz |
| 2013/0046799 A1 | 2/2013 | Hale et al. |
| 2013/0053019 A1 | 2/2013 | Schilling |
| 2013/0054517 A1 | 2/2013 | Beechuk et al. |
| 2013/0054583 A1 | 2/2013 | Macklem et al. |
| 2013/0054668 A1 | 2/2013 | Rajan et al. |
| 2013/0054714 A1 | 2/2013 | Bedi |
| 2013/0055078 A1 | 2/2013 | Berger et al. |
| 2013/0055113 A1 | 2/2013 | Chazin et al. |
| 2013/0055159 A1 | 2/2013 | Levine et al. |
| 2013/0055232 A1 | 2/2013 | Rajan et al. |
| 2013/0060859 A1 | 3/2013 | Olsen et al. |
| 2013/0061156 A1 | 3/2013 | Olsen et al. |
| 2013/0085745 A1 | 4/2013 | Koister et al. |
| 2013/0086670 A1 | 4/2013 | Vangpat et al. |
| 2013/0091149 A1 | 4/2013 | Dunn et al. |
| 2013/0091171 A1 | 4/2013 | Lee |
| 2013/0091217 A1 | 4/2013 | Schneider |
| 2013/0091229 A1 | 4/2013 | Dunn et al. |
| 2013/0097242 A1 | 4/2013 | Hubick |
| 2013/0097253 A1 | 4/2013 | Mencke |
| 2013/0103641 A1 | 4/2013 | Rehman |
| 2013/0103701 A1 | 4/2013 | Vishnubhatta et al. |
| 2013/0117191 A1 | 5/2013 | Jagota et al. |
| 2013/0117287 A1 | 5/2013 | Jagota et al. |
| 2013/0117353 A1 | 5/2013 | Wong et al. |
| 2013/0117683 A1 | 5/2013 | Rajagopal |
| 2013/0132861 A1 | 5/2013 | Kienzle et al. |
| 2013/0137420 A1 | 5/2013 | Schilling |
| 2013/0159279 A1 | 6/2013 | Hofhansl et al. |
| 2013/0159434 A1 | 6/2013 | Kumar |

\* cited by examiner

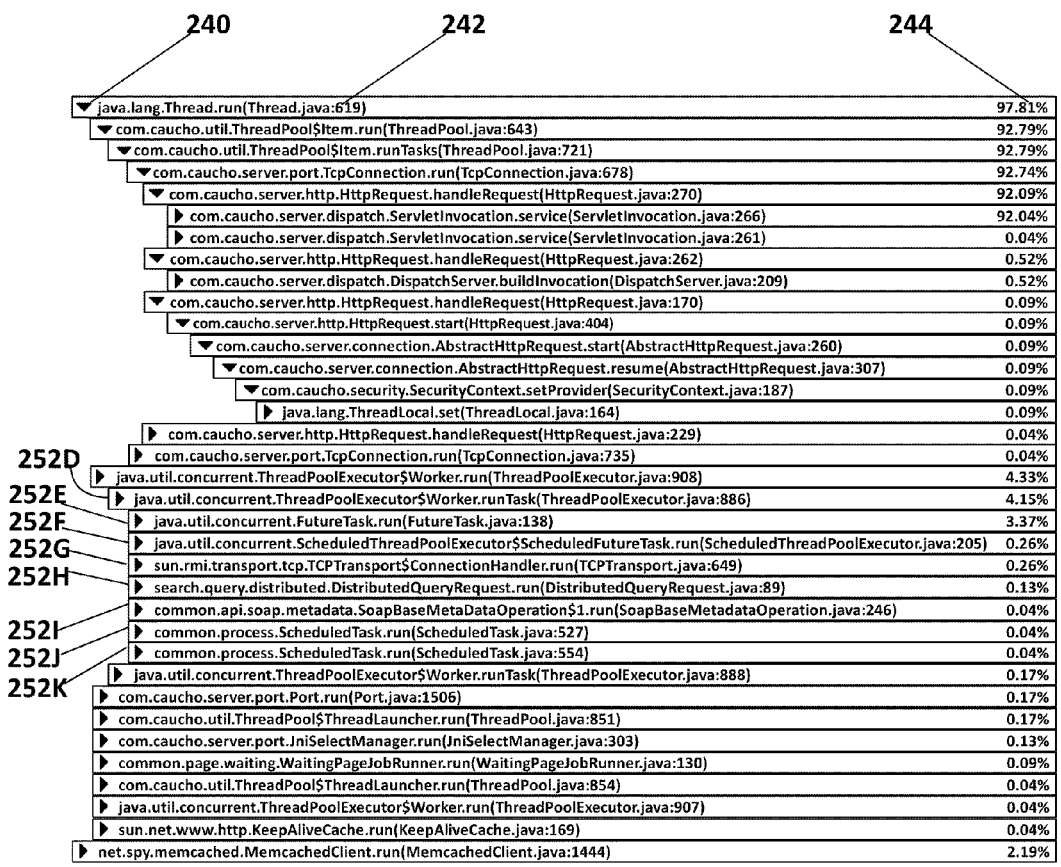

| | | |
|---|---|---|
| ▼ java.lang.Thread.run(Thread.java:619) | | 97.81% |
| ▼ com.caucho.util.ThreadPool$Item.run(ThreadPool.java:643) | | 92.79% |
| ▼ com.caucho.util.ThreadPool$Item.runTasks(ThreadPool.java:721) | | 92.79% |
| ▼ com.caucho.server.port.TcpConnection.run(TcpConnection.java:678) | | 92.74% |
| ▼ com.caucho.server.http.HttpRequest.handleRequest(HttpRequest.java:270) | | 92.09% |
| ▶ com.caucho.server.dispatch.ServletInvocation.service(ServletInvocation.java:266) | | 92.04% |
| ▶ com.caucho.server.dispatch.ServletInvocation.service(ServletInvocation.java:261) | | 0.04% |
| ▼ com.caucho.server.http.HttpRequest.handleRequest(HttpRequest.java:262) | | 0.52% |
| ▶ com.caucho.server.dispatch.DispatchServer.buildInvocation(DispatchServer.java:209) | | 0.52% |
| ▼ com.caucho.server.http.HttpRequest.handleRequest(HttpRequest.java:170) | | 0.09% |
| ▼ com.caucho.server.http.HttpRequest.start(HttpRequest.java:404) | | 0.09% |
| ▼ com.caucho.server.connection.AbstractHttpRequest.start(AbstractHttpRequest.java:260) | | 0.09% |
| ▼ com.caucho.server.connection.AbstractHttpRequest.resume(AbstractHttpRequest.java:307) | | 0.09% |
| ▼ com.caucho.security.SecurityContext.setProvider(SecurityContext.java:187) | | 0.09% |
| ▶ java.lang.ThreadLocal.set(ThreadLocal.java:164) | | 0.09% |
| ▶ com.caucho.server.http.HttpRequest.handleRequest(HttpRequest.java:229) | | 0.04% |
| ▶ com.caucho.server.port.TcpConnection.run(TcpConnection.java:735) | | 0.04% |
| ▶ java.util.concurrent.ThreadPoolExecutor$Worker.run(ThreadPoolExecutor.java:908) | | 4.33% |
| ▶ java.util.concurrent.ThreadPoolExecutor$Worker.runTask(ThreadPoolExecutor.java:886) | | 4.15% |
| ▶ java.util.concurrent.FutureTask.run(FutureTask.java:138) | | 3.37% |
| ▶ java.util.concurrent.ScheduledThreadPoolExecutor$ScheduledFutureTask.run(ScheduledThreadPoolExecutor.java:205) | | 0.26% |
| ▶ sun.rmi.transport.tcp.TCPTransport$ConnectionHandler.run(TCPTransport.java:649) | | 0.26% |
| ▶ search.query.distributed.DistributedQueryRequest.run(DistributedQueryRequest.java:89) | | 0.13% |
| ▶ common.api.soap.metadata.SoapBaseMetaDataOperation$1.run(SoapBaseMetadataOperation.java:246) | | 0.04% |
| ▶ common.process.ScheduledTask.run(ScheduledTask.java:527) | | 0.04% |
| ▶ common.process.ScheduledTask.run(ScheduledTask.java:554) | | 0.04% |
| ▶ java.util.concurrent.ThreadPoolExecutor$Worker.runTask(ThreadPoolExecutor.java:888) | | 0.17% |
| ▶ com.caucho.server.port.Port.run(Port.java:1506) | | 0.17% |
| ▶ com.caucho.util.ThreadPool$ThreadLauncher.run(ThreadPool.java:851) | | 0.17% |
| ▶ com.caucho.server.port.JniSelectManager.run(JniSelectManager.java:303) | | 0.13% |
| ▶ common.page.waiting.WaitingPageJobRunner.run(WaitingPageJobRunner.java:130) | | 0.09% |
| ▶ com.caucho.util.ThreadPool$ThreadLauncher.run(ThreadPool.java:854) | | 0.04% |
| ▶ java.util.concurrent.ThreadPoolExecutor$Worker.run(ThreadPoolExecutor.java:907) | | 0.04% |
| ▶ sun.net.www.http.KeepAliveCache.run(KeepAliveCache.java:169) | | 0.04% |
| ▶ net.spy.memcached.MemcachedClient.run(MemcachedClient.java:1444) | | 2.19% |

240, 242, 244

252D, 252E, 252F, 252G, 252H, 252I, 252J, 252K

SOFTWARE PERFORMANCE PROFILING IN A MULTI-TENANT ENVIRONMENT

CLAIM OF PRIORITY

This application claims the benefit of U.S. Provisional Patent Application 61/395,376 entitled, METHODS AND SYSTEMS FOR DEBUGGING IN A MULTI-TENANT ENVIRONMENT, by William J. Gallagher et al., filed May 12, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and more specifically to debugging software.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions In a conventional on-demand service, software and performance debugging may be performed in a conventional manner. In test automation software is used to control the execution of tests, the comparison of actual outcomes to predicted outcomes, the setting up of test preconditions, and other test control and test reporting functions. Commonly, test automation involves automating a manual process already in place that uses a formalized testing process. Test automation tools with graphical user interfaces (GUI) assist programmers to quickly create applications that have dramatically improved programmer productivity, as well as decreasing the pressure on testers, who are often perceived as bottlenecks to the delivery of software products. Testers are consistently asked to test more and more programming code in less and less time. Test automation is one way to keep up with the increasing amounts of programming code that requires testing, as manual testing is time consuming. Traditionally, as different versions of software are released, the new features need to be tested manually. However, test automation tools with GUI features reduce the test time, as well as the cost associated with new software releases. Unfortunately, software and performance debugging in an on-demand service may at times be cumbersome.

Accordingly, it is desirable to provide better techniques for performance debugging in on-demand systems.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 2A-2C are screen shots illustrating an example of a set of user interface screens supporting techniques for software profiling in a multi-tenant database network system and computing environment.

DETAILED DESCRIPTION

General Overview

Figure 1:
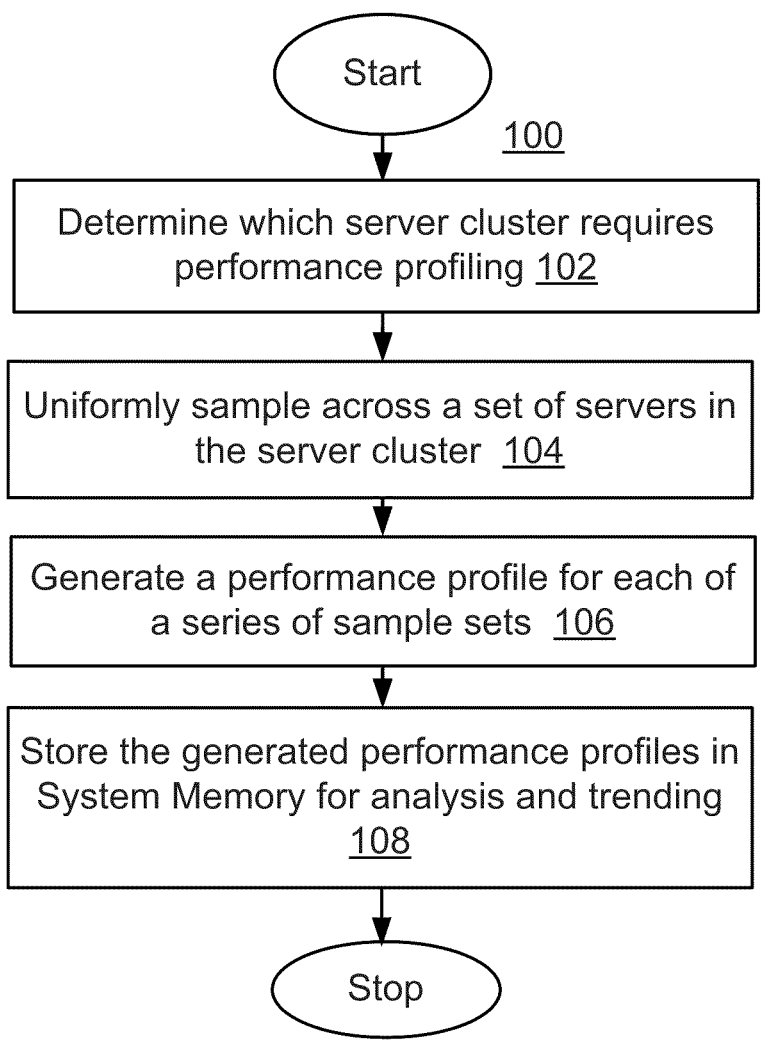
FIG. 1 shows a flowchart of an example of a method for profiling software that may be used on clusters of application server in a cloud computing environment.

Systems and methods are provided for software performance analysis and debugging in a multi-tenant database network system. The systems and methods provided for software performance analysis and debugging in a multi-tenant database network system enable embodiments to provide users with sampling and profiling tools for large, clustered application server based cloud computing environments in which business and other services are, such as a relational database and customer relations management services provided over the web so that user does not need to become familiar with the details of how to run and maintain the service provided. In this specification any place the term user is used the word organization or another user may be substituted to obtain other embodiments.

In this specification, mechanisms and methods for providing sampling and profiling tools for large, clustered application server based cloud computing environments will be described with reference to example embodiments.

In accordance with embodiments, there are provided mechanisms and methods for profiling software, which may include performance analysis and/or debugging information, in a multi-tenant database network system. These mechanisms and methods for profiling software in a multi-tenant database network system can enable embodiments to provide users with sampling and profiling tools for large, clustered application server based cloud computing environments. The cloud computing environment may include a shared database, shared software, shared information, and/or other shared resources that are provided to computers and other devices on-demand as a service. While in the cloud computing environment, the clustered application server may provide web-based tools or applications for users to access through a web browser of a client, that run as if the tools or applications were programs installed locally on the client computer.

Current sampling and profiling tools work well for individual applications running alone. However, for large, clustered application server based cloud computing environments, prior to the systems and methods of the current specification, there are no tools that allow for holistic sampling and profiling simultaneously and efficiently across all application servers in a cluster. The ability of embodiments to provide for holistic sampling and profiling simultaneously and efficiently across all application servers in a cluster can enable a profiler that can selectively profile certain threads in a multi-tenant environment based on the thread's consumer, which may be a user, for example. The threads in this specification may be tasks that runs concurrently (having separate execution paths), such as JAVA threads, which optionally may share the same data area (so as not to be processor intensive operations). The profiler may produce profiles of the performance of threads, which may be referred to as a performance profile.

Traditional profilers attach to a single program, or JVM in the case of Java, and operate on that singular program. A program or JVM can consist of many threads and traditional profilers can examine all of the threads on a single program or a subset of the threads.

A cluster of servers or an "instance" may be a collection of several servers, each running its own JVM or program which in turn may have 100's of threads. Traditionally, it would only be possible to profile and monitor the performance of each server individually. As a result of the pre-condition that the servers perform similar tasks and with each other, e.g., in a cloud computing environment, all of the servers and their programs can be profiled together and then collate and aggregate the results into a format that is meaningful and useful for monitoring the entire system.

Thus the ability of embodiments of the profiling tools to profile across clustered servers and selectively profile only certain parts of the application is an advantage that existing profiling tools are not capable of.

In at least one embodiment, a method for profiling in a multi-tenant database network system (e.g., Google™, Inc., Salesforce.com®, Inc., etc.) is provided. Profiling may include a performance analysis based on sampling, which may be used for debugging the program. In at least one embodiment, the sampling is achieved using configuration files of each server cluster. The configuration files may include initial settings for the sampling, server processes, and operating system settings. In at least one embodiment, the configuration files are read by the method at startup and/or periodically checked for changes. The configuration files are accessed to determine the host names of servers and to determine which servers to profile. Knowledge of the host names of each server in the cluster enables a profiler to target a single server for each sample, thereby facilitating a round-robin sample across a clustered server environment such that a CPU's load and processing cost associated with sampling is fairly and uniformly distributed across all servers in the cluster (during the round-robin all of the servers of the server cluster are sampled in a set order).

The profiling may include a dynamic program analysis (as opposed to static code analysis), investigating the program's behavior using information gathered as the program executes, which may be used to determine which sections of a program to optimize to increase its overall speed and/or decrease a programs memory requirement, for example. During the performance profiling information is gathered that relates to the identity of the thread and the resources consumed by the thread, such as how much memory is allocated to the thread, the frequency of function calls, and the duration of function calls, and/or other performance data. Contextual information about requests and users is shared across servers in a cloud computing environment. A user and the user's requests may be transferred from server to server in the cluster depending on many factors such as the load of each server (to distribute the load evenly across all servers). The sharing of contextual information allows the aggregation all of the samples from the individual servers across a cluster together, because the servers of the cluster act as one system (although each server still runs on a separate virtual machine, such as a JVM).

The profiler may measure the frequency and duration of function calls, memory usage, and/or other performance data. As a result of the round robin sampling, in at least one embodiment of the analysis and debugging tool, each sample may be a complete stack trace dump of each thread running on the application server at that moment in time. A stack trace dump of a thread may be an ordered list of the current methods being executed followed by the thread (see example appearing below). In this specification, the methods that are executed may be methods in the typical usage of the word in the context of software, such as in a C or JAVA program, in addition to being generic to any routine, process, subroutine, function, class, gosub, or portion of code that is called or accessed by another portion of code. The stack that is referred to in the "stack trace dump" may be the stack that stores all of the information about the method that is running and may include a last in, first out (LIFO) data structure for storing information of the dump. During the stack trace dump, for a stream of events of the stack generated by the thread of interest during a profiling session, the state of the working memory of the system at a specific time, such as at the time of a crash, is recorded. Optionally, other information about the program state may also be recorded at the same time, such as the content of processor registers, counter and stack pointer values, memory management information, other processor flags, other operating system flags, and/or other information. In at least one embodiment, profiling is achieved by aggregating the stack trace dumps of each thread over all samples (that is collecting information from the stack trace dumps of all samples of each thread) to generate both a call graph and back trace graph. By generating both a call graph and a back trace graph, the user can determine both which methods are being called more times than is desirable (and is therefore hotspot) and which methods may be calling the hotspot method more times than desirable and are thereby creating the hotspot. Selective profiling is achieved in at least one embodiment by isolating the tasks of the threads to a single user.

In an embodiment, when a user logs in, the user generates a unique session ID, which is included in a user context, and whenever the user sends a request the user must pass in the unique session id to authenticate the request. Consequently, it may be determined which thread is processing which request and it may be determined which user sent the request. By associating requests with a session ID (from which the user may be determined) specific performance problems of users may be diagnosed. Through the use of user contexts, embodiments may tag each thread with an ID during sampling. For example, the thread may be isolated to a particular user that is assigned a user context, which contains information about the user running the tasks associated with the thread, such as a user ID. Thus, during profiling, filters may be created to only profile threads with or without certain user IDs resulting in selective profiling. Optionally, other information may be included in the user context, such as which functions a specific user is allowed to perform.

In at least one embodiment, a profiler implemented with a Java Virtual Machine (JVM) applies a stack trace dump based sampling and profiling to a clustered, multiple server based cloud computing environment (instead of profiling the each server individually). The JVM may enable a set of computer software programs and data structures to use a virtual machine model for the execution of the profiler. The virtual machine model used by the JVM may accept a form of a computer intermediate language, such as Java bytecode. The Java bytecode may represent the instruction set of the architecture on which the stack is implemented. Although the specification refers to a JVM, any virtual machine may be substituted. In an alternative embodiment, the computer intermediate language may be an assembly language and/or another interpreter.

In at least one embodiment, a sampling will not be isolated to a single JVM or to a single application server but will instead be applied to multiple application servers (e.g., all application servers in the cluster). The application of the sampling to multiple applications servers is achieved through the fact that each application server is running the exact same code and software, which provides an advantage over traditional profilers as it reduces the non-trivial sampling load overhead on a single server by spreading out sampling over multiple servers. Non-trivial sampling overhead is the processing overhead required of traditional profilers. Traditional profilers stop the program being profiled at set intervals for collecting a stack trace dump. The interval is usually in the milliseconds, which causes a slowdown in the program being profiled, which is a non-trivial overhead caused by the sampling.

Since the present profiler operates on a cluster, although the sampling may occur at the same intervals of time as a traditional profiler, the samples are not performed on the same server, so the intervals of time between samples on the same server is significantly longer than were the a single profiler profiling a single server. The sampling may be spread out or distributed amongst all of the servers. Thus, for example, if there are 30 servers in the cluster, the overhead associated with sampling with the current profiler may be only $\frac{1}{30}^{th}$ of that of traditional profilers and thus the overhead of the profiling is relatively trivial compared to the overhead of individual traditional profilers profiling each server. The distribution of sampling amongst all of the servers of the clusters may also allow for the reduction in sampling noise caused by isolated abnormalities on a single application server. Isolated abnormalities result from a single user or request doing something that is isolated to a single server and not indicative of the performance state of the other servers.

By reducing outlying noise and sampling across the entire cluster, the profiler will be able to more accurately identify application "hotspots" that may be potential defects or candidates for performance tuning and enhancements. Hotspots may be spots in a call graph or back trace graph (both graphs will be explained below) corresponding to routines that have a high numbers of calls. Hotspots are routines that are called particularly frequently from another routine.

In addition to holistic profiling of the entire application across all application servers, embodiments are also capable of selective profiling of individual users and organizations in a multi-tenant environment. Selective profiling of individual users and organizations is achieved through assigning user contexts to each thread running on the application such that each thread and subsequent stack trace can be tagged with a user (or organization) ID for selective profiling based on the user IDs. The thread may be a task that is performed by an operating system. A thread may result from a fork of a computer program into two or more concurrently running tasks.

Furthermore, in at least one embodiment, the samples and profiles are captured and processed at a regular interval to monitor and track trends and changes in the application servers and software as well as for the alerting and identification of regressions that may make a feature stop functioning as intended after a certain event.

In at least one embodiment, the performance profiles are accessible through a web based interface, which facilitates quickly identifying current hotspots, and monitors changes in historical hotspots.

In at least one embodiment, user interfaces for the software profiling tool for multi-tenant database network systems are provided. The user interface provides the user with back traces and call graphs that are viewable and explorable through a web based interface that allows the user to choose the sample based on the server cluster. In at least one embodiment, both back traces and call graphs are displayed in a tree format (see FIGS. 2A-2C for example embodiments) as an asynchronous Javascript based tree interface (that does not require synchronization) that allows for the expansion and collapsing of individual branches as well as identifying the top hotspots in a pie chart diagram.

The asynchronous Javascript based interface may used be for exploring collected data in the call graph and back traces, which may be arranged in a tree hierarchy (e.g., for viewing in an interface). The tree hierarchy/interface for interacting with the collected data is asynchronous in that sections of the tree are loaded on demand and asynchronously from the database. In other words, the data that is loaded into the tree hierarchy/interface does not need to be synchronized with the source of the data. Sections of the tree interface are loaded on demand and asynchronously since the whole tree may be very large, and loading and rendering the complete tree all at once would require a lot of data to be transmitted and processed. In an instance that a user wants to see a branch in the tree, the underlying data is requested asynchronously, since the page of the user interface loads the data in the background and will display the data when the data is retrieved and processed while not blocking the user from doing other tasks on the page. Furthermore, at least one embodiment of the interface provides the user of the debugging software with the ability for text based searches of stack frame nodes in both graphs. An inquiry of what a thread is currently performing or doing is provided through a stack trace. An example of a stack trace would be Java Method A called->Java Method B called->Java Method C. Each element in a stack trace is referred to as a stack frame. Stack frame and stack frame node are synonymous. In at least one embodiment, space is allocated on the stack when a procedure is called and is removed upon return from the procedure. The stack frame is the block of information stored on the stack to affect a procedure call and return. The call graph may be generated from this stack trace. The stack may be composed of stack frames (sometimes called activation records), which may include machine dependent data structures and may contain subroutine state information. Each stack frame may correspond to a call of a subroutine that may not yet have terminated with a return.

In at least one embodiment, the stack trace is generated by walking the stack backwards. Walking refers to manipulating and expanding call and back trace graphs to determine information and gain an understanding of the underlying processes. For example given a stack trace, Java Method A called->Java Method B called->Java Method C, a walking process would be performed from Java Method A to get a call graph of which method executed which other method. Furthermore, for a back trace, the walking is conducted in the opposite direction by starting at Java Method C to find out which method was called by which other method. The stack trace provided may be advantageous for users who encounter multi-tenant production systems software errors that are often difficult to isolate and debug. Typically, errors that are driven by—that is caused at least in-part by—user data versus errors due to errors in the program code are particularly difficult to reproduce in an isolated test or development environment. Using the performance profiling, user data driven errors may be detected by generating a stack trace at an error location, and send the information in the generated stack trace to an engineer for investigation. In addition, there may be additional information added to the stack trace to help with the analysis process. In at least one embodiment, by walking the stack backwards (e.g., by constructing a graph of the back trace), a final result may be provided that includes performance information with the same fidelity as if a debugger had been attached to the process for inspection (an example of a back trace graph is given below).

In at least one embodiment of the tools for software performance analysis and debugging in a multi-tenant database network system the sampling and profiling process is conducted as follows:

1. Check a log or register storing past performance profiling runs, referred to as a profiling log, as well as a schedule of when server clusters should be scheduled to determine if a server cluster needs to be profiled.

2. In at least one embodiment, when the event a server cluster needs to be profiled, a sampling of all the servers in that cluster is scheduled (and then performed according to the schedule).

3. In at least one embodiment, sampling is performed uniformly (e.g., evenly) across all servers in the cluster (or a set of a plurality of servers) to distribute the processing load required for sampling, and to reduce noise from individual servers. The sampling may be performed at set intervals for set durations of time. An example of a set interval for sampling the same server may be every second for a set duration of ten minutes. In at least one embodiment, the interval and duration is user determinable based on the processing environment, work load, and the kind of information that is to be captured and/or otherwise obtained.

4. A separate processing task finds sampling tasks that have completed and generates a performance profile for each sample set.

5. Each performance profile is stored for later retrieval, analysis, and trending.

Details of Profiler

FIG. 1 shows a flowchart of an example of a method 100 for software profiling with sampling and profiling tools that may be used in large, clusters of application servers in a cloud based computing environments. In step 102, a check of a profiling log is performed to determine a pattern and schedule for past and future profiling runs for one or more server clusters to determine when a particular server cluster requires (e.g., os is scheduled for) performance profiling. In step 104 a cluster scheduled for a profiling run is uniformly sampled across a set of servers that constitute the cluster. In step 106. a processing task generates a performance profile for each of a series of sample sets that result from the profiling run that was run on the particular server cluster. In step 108, the generated performance profile is stored for later retrieval, analysis, and trending. An example of analysis and trending is the utilization of stored performance profiles or snapshots to determine the change in location and order of rank of server hotspots between software releases. For example, if in a current software release, the known top three hotspots are A, B, and C in that order, and are normally expected operations with a high occurrence. However, after a release of new software, the top three hotspots are C, B, and A in the order of the frequency of the occurrence. The reordering and/or change in occurrences of server hotspots may indicate something has changed that requires investigation. In other words, the trend in terms of hotspots has changed as determined by a comparison analysis of stored performance profiles or performance states before and after a certain events such as a release of new software that has necessitated the need to identify potential software defects in the new software release.

In at least one embodiment, each of the steps of method 100 is a distinct step. In another embodiment, although depicted as distinct steps in FIG. 1, steps 102-108 may not be distinct steps. In at least one embodiment, method 100 may not have all of the above steps and/or may have other steps in addition to or instead of those listed above. The steps of method 100 may be performed in another order. Subsets of the steps listed above as part of method 100 may be used to form their own method.

In at least one embodiment of the tools for software performance analysis and debugging in a multi-tenant database network system the sampling is achieved using configuration files of each server cluster. In at least one embodiment, clusters of servers share the role of processing requests and are configured to perform in a similar manner. Thus, the servers in each cluster perform similar tasks, and therefore in at least embodiment a cluster of servers is sampled together to form a single sampling profile. Knowledge of configuration files is used to determine which servers belong to a particular cluster, the server's role, and how to access the servers. The profiler may have knowledge of the host names of each server in the cluster and may be able to target a single server for each sample and thus be able to sample across a clustered server environment fairly and evenly such that the CPU load and processing cost associated to sampling is distributed uniformly across all servers in the cluster.

In at least one embodiment, there is one host system, which may be a specialized server, that is not part of the clusters servers performs the sampling and profiling. This host takes turns profiling each individual application server within the cluster to see what each application server is doing and to find out if there are any hotspots or defects associated with a particular application server.

In at least one embodiment of the tools for software profiling is achieved by aggregating the stack trace dumps of each thread over all samples to generate both a call graph and back trace graph. Each server may contain multiple threads running various portions of code.

A stack trace dump of a thread is an ordered list of the current methods being executed followed by the subsequent methods that called the concurrent methods. For example, the stack trace dump:

```
java.lang.Object.wait(Native Method)
java.lang.ref.ReferenceQueue.remove(ReferenceQueue.java:118)
java.lang.ref.Finalizer$FinalizerThread.run(Finalizer.Java:159)
``` indicates that code at "java.lang.refFinalizer$FinalizerThread.run(Finalizer.java:159)" called "java.lang.refReferenceQueue.remove(ReferenceQueue.java:118)" which finally called "java.lang.Object.wait(Native Method)," which is the portion of code that is currently being executed by the thread. The numbers appearing in the code above refer to the line number of the code corresponding to that method.

As an example of how the data in a sample is aggregated, a call graph is generated in the traditional fashion of stack traces such that Method A calls Method B calls Method C and Method D forms a call graph of:

```
    Method A ->
        Method B ->
            Method C
            Method D
```

An example of a call graph using the lines of code above in paragraph [0044] is as follows:

```
java.lang.ref.Finalizer$FinalizerThread.run(Finalizer.Java:159)
java.lang.ref.ReferenceQueue.remove(ReferenceQueue.java:118)
java.lang.Object.wait(Native Method)
```

The back trace graph is generated in reverse such that each method call has its own branch (and its children all descend from the methods that called it). Given the same example as above, the back trace graph would be:

```
            Method A
            Method B ->
                Method A
            Method C ->
                Method B ->
                    Method A
            Method D->
                Method B ->
                    Method A
```

Each stack frame node in both the call graph and back trace graphs are then associated with a count of how many samples that specific stack frame appeared in. The stack frames with the most occurrences may then be identified as hotspots as the application was running that stack frame the majority of the time.

An example of two samples of one thread, the two stack trace dumps may be as follows,
Sample 1:
→Method C
→Method B
→Method A
Sample 2:
→Method C
→Method D
→Method A A tree with a root node "root" may be created. In this tree whenever a new sample is inserted a counter for root is incremented and whenever a method node is inserted that already exists a counter for that method is incremented. Thus, the two samples would be combined into the same back trace, as follows.
Root (2)
→Method C (2)
  →Method B (1)
    →Method A (1)
  →Method D (1)
    →Method A (1)

In the above example, the counter for method A is not incremented, because method A appears twice in the graph, and thus the sum of the counters for method A represents the number of times that method A was sampled. Selective profiling may be achieved in at least one embodiment by isolating the tasks of threads to a single user through the use of user contexts or identifications (ID). In at least one embodiment, when a user logs into an application a user context is established with user information, such as the organization identification (org ID) and/or user ID. Whenever the user tries to do a requested operation, a thread may be required to perform the requested operation and this thread may use the created user context for a variety of operations. Thus in at least one embodiment which thread is performing what operation for which user is known. At least one embodiment can tag each thread with a context ID during sampling. Thus, during profiling, filters may be created to only profile threads with or without certain user IDs resulting in selective profiling.

At least one embodiment provides users with the back traces and call graphs in a manner such that the back traces and call graphs are viewable and explorable through an interface that may be web based. In addition to being able to see a profile of an entire cluster, the user may be allowed to choose the sample based on the server cluster. Both the call graph and the back trace graph may be displayed in an asynchronous Javascript based tree interface that allows for the expansion and collapsing of individual branches as well as identifying the top hotspots in a pie chart diagram. Furthermore, the interface may allow for text based searches of stack frame nodes in both the call graph and the back trace graph.

Figure 2A:
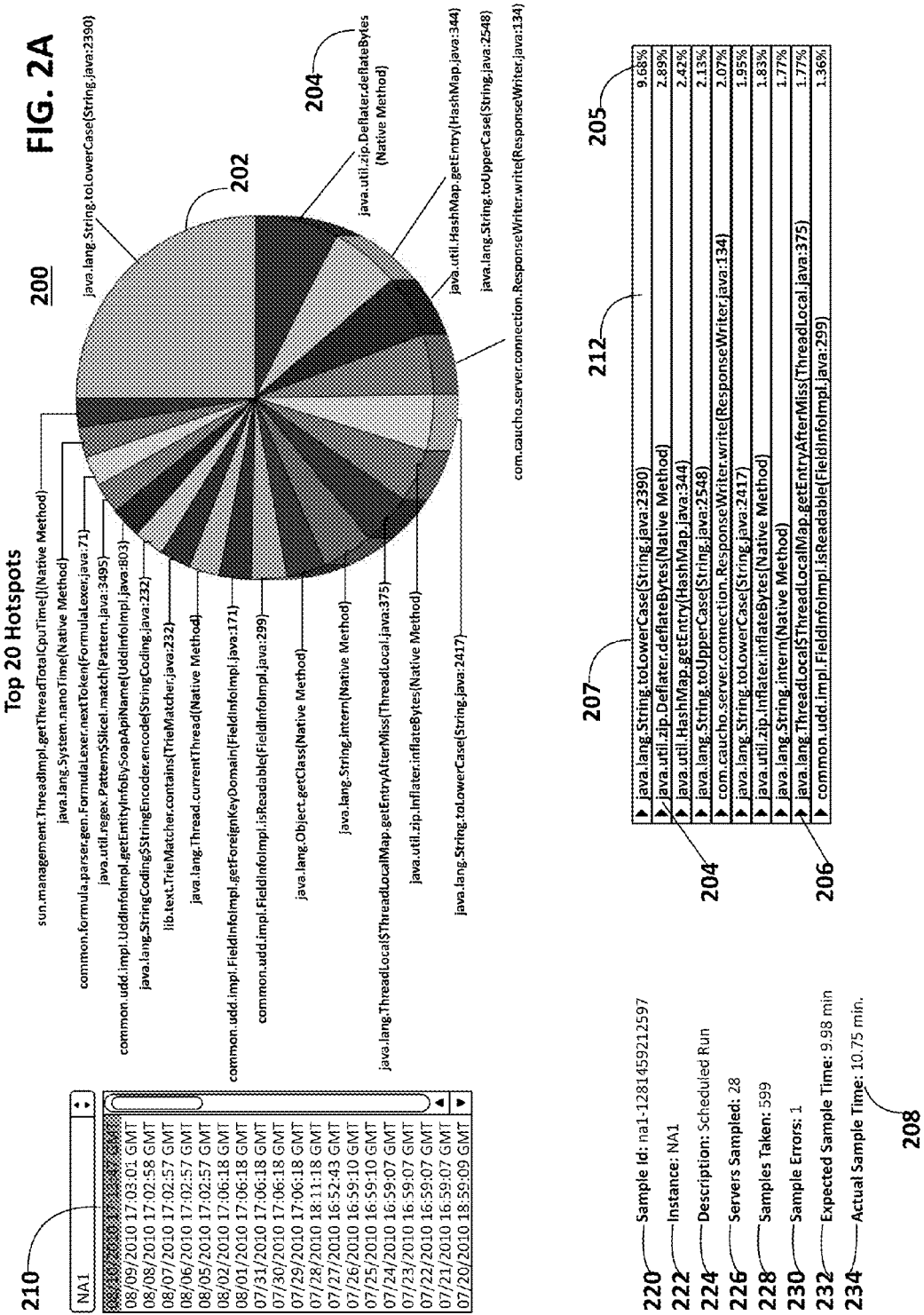

FIGS. 2A and 2C are screen shots illustrating example embodiments of user interface (UI) screens supporting techniques for profiling a computing environment.

FIG. 2A shows a screen shot of a user interface 200 for displaying server performance hotspots and sampling information. The user interface 200 may include pie chart 202, methods 204, percentages 205, back trace tree 206, branches 207, sampling statistic information 208, sampling schedule 210, selected branch 212, sample ID 220, instance 222, description 224, the number of servers sampled 226, the number of samples taken in the sample run 228, sample errors encountered during the sample run 230, the expected sample time for the sample run 232, and the actual sample time encountered 234. In other embodiments, the user interface 200 may not have all of the elements listed and/or may have other elements instead of or in addition to those listed.

The user interface page 200, which may be a web page, provides a user with information on performance hotspots for servers that are sampled and profiled. A pie chart 202 provides a graphical representation of the top occurrences or hotspots of processes or methods that are occurring in a sampled server cluster. Methods 204 are the methods that are running and are being monitored on user interface page 200 as part of the performance profile. The top occurrences or hotspots of methods 204 are illustrated as a proportional slice of pie chart 202 of the top 20 hotspots (i.e., highest percentage of occurrences of processes or methods), that require the most processing time within the sampled server cluster. It is noted that in other embodiments other graphical techniques may be employed, such as bar graphs, to display the magnitude or frequency of methods within a sample of a server cluster. Percentages 205 indicate the percentage of resources (e.g., memory and method calls) allocated to the corresponding one of methods 204 of the corresponding branch. The back trace tree 206 lists the methods 204 found during the sampling in a descending order by the percentage of occurrences in the branches. Branches 207 are the branches in back trace tree 206. The back trace tree 206 (also referred to as a graph) is generated in reverse order, with one branch for each method call, each branch starting with the last method called, followed by the methods that called that method, followed the methods that called those methods, and so on, such that each method call (of methods 204) has its own branch (with a method 204) and its children (sub branches), where the children of each method are all of the methods that call that method. A further description of an expanded back trace tree 206 with branches 207 is provided in FIG. 2B and the accompanying written description. Sampling statistics 208 include various statistics of the sampling, such as the sample ID, the number of instances, a description of the sample run, the number of servers sampled, the number of samples taken in the sample run, sample errors encountered during the sample run, the expected sample time for the sample run, and the actual sample time encountered. The sampling schedule list 210 provides the actual times that the sampling runs are being conducted. Selected branch 212 is one particular branch of branches 207 within back trace tree 212, which has been selected, as may be indicated by the color and/or shading of selected branch 212 being different than the other branches that have not been selected. Selected branch 212 is discussed further in conjunction with FIG. 2B.

Sample ID 220 identifies which sample is being run in the profiling process. Instance 222 is an identifier of the instance of the profiler that took the sample, which may also be used to help identify the sample. Description 224 may be a description of the sample, which may provide information on the type of sample run being conducted. In the embodiment shown in FIG. 2A, the description 224 informs the user that the sample run was a scheduled sample run. The number of servers sampled 226 is the number of servers that were sampled within a server cluster during a sample run. The number of samples taken in the sample run 228 is the number of samples taken in the sample run. Sample errors encountered during the sample run 230 are samples that were not completed successfully during the sample run. The expected sample time for the sample run 232 is the theoretical time a sample run should take based on the size of the server cluster being sampled. The actual sample time encountered 234 is the actual time the sample run was conducted. In at least one embodiment, sampling statistic information 208 may include, but is not limited to, sample ID 220, instance 222, description 224, the number of servers sampled 226, the number of samples taken in the sample run 228, sample errors encountered during the sample run 230, the expected sample time for the sample run 232, and the actual sample time encountered 234 and/or other sampling statistics.

Figure 2B:
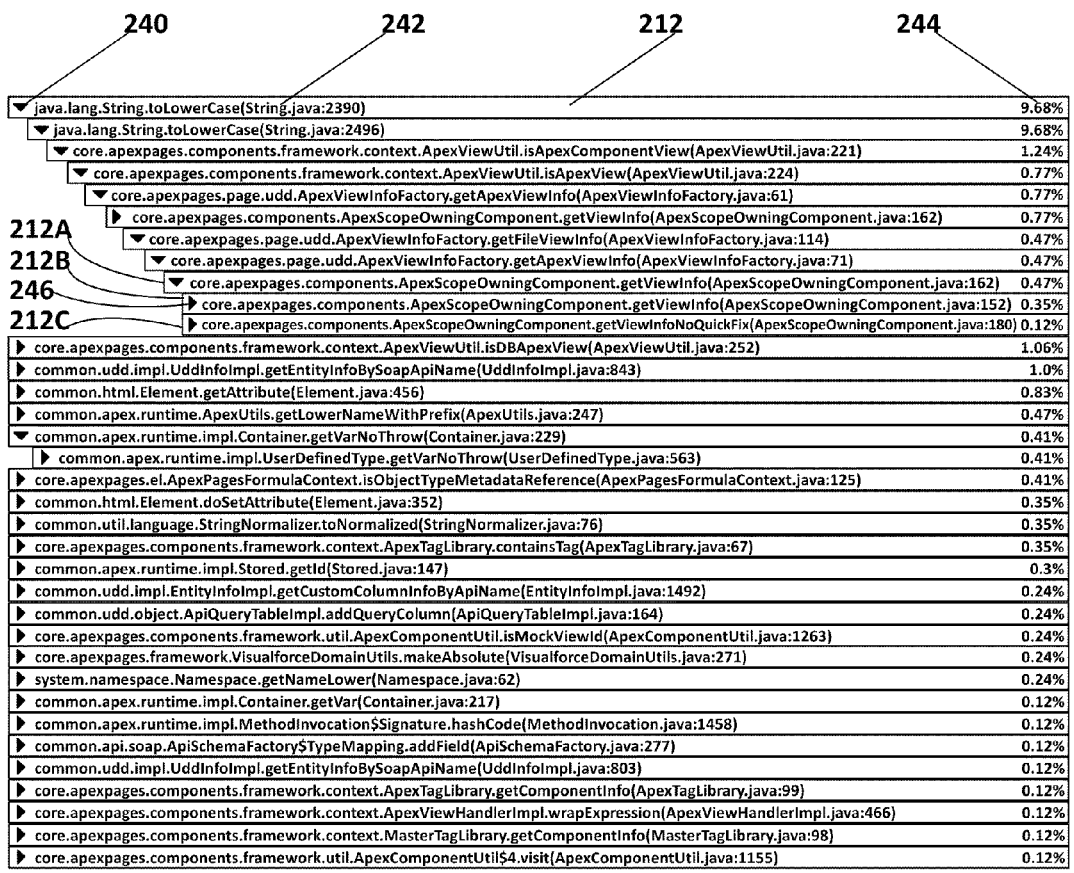

FIG. 2B shows a screen shot of the back trace tree 206 of FIG. 2A expanded within the user interface 200 (which may have been expanded for displaying server performance hotspots and sampling information). The expansion of back trace tree 206 may include branch 212A, branch 212B, branch 212C, expander icon 240, string description 242, processing percentage 244, and expanded indicator icon 246. In other embodiments, the back trace tree 206 may not have all of the elements listed and/or may have other elements instead of or in addition to those listed.

In the embodiment of FIG. 2B, a user may expand a back trace tree by placing a cursor on a string in the back trace tree to view further methods in the string. In FIG. 2B branch 212 of back trace tree 206 of FIG. 2A is expanded further to its children branches/parent methods (e.g., branches 212A, 212B, and 212C) that are all of the methods that call the method of branch 212 (the parent methods are represented by the child branches). In FIG. 2B the individual graphical components of branch 212 are shown. Branches 207 within back trace tree 206 are presented in descending percentage of occurrence (processing percentage 244) of a process or method within a profiled cluster. Expander icon 240 indicates that a branch 212 may be further expanded to show its own branch and its children that are all of the methods that call it. Expanded indicator icon 246 appears in branches that result from the expansion of a parent branch. In the example embodiment of FIG. 2B parent branch 212A with a percentage of occurrence of 0.47% is further expanded into children branches of 212B and 212C with percentages of occurrence of 0.35% and 0.12%, respectively. The sum of the percentage occurrences of child branches 212B and 212C (0.35%+0.12%) is equal to the percentage occurrence (0.45%) of the parent branch 212A.

FIG. 2C shows a screen shot of a call graph tree 250 expanded within the user interface 200 for displaying server performance hotspots and sampling information. The expansion of call graph tree 250 may include branch 252D, branch 252E, branch 252F, branch 252G, branch 252H, branch 252I, branch 252J, branch 252K, expander icon 260, string description 262, processing percentage 264, and expanded indicator icon 266. In other embodiments, the call graph tree 250 may not have all of the elements listed and/or may have other elements instead of or in addition to those listed.

Call graph 250 may be viewable on the same page as shown in FIG. 2A. Alternatively, the page of FIG. 2A may have a link for accessing call graph 250. In an embodiment, the main branch in call graph 250 may be a branch that represents the thread of a particular user (e.g., tenant or other organization) that has been isolated. As shown and described in the embodiment of FIG. 2C a user may expand a call graph tree by placing a cursor on a branch 252 in the call graph tree to view further methods related to the parent branch. In FIG. 2C branch 252D of call graph tree 250 is expanded further to its children branches (branches 252E, 252F, 252G, 252H, 252I, 252J, and 252K) that are all of the methods that call the method of branch 252. In contrast to back trace graph 206, in call graph 250 a child branch represents a child method and parent branch represents a parent method.

Expander icon 260 may be essentially the same as expander icon 240 (FIG. 2B), except that each is on a different graph. In FIG. 2C the branches within call graph tree 250 are presented in descending percentage of occurrence (of processing percentage 264) of a process or method within a profiled cluster. Processing percentage 264 may be similar to processing percentage 244 (FIG. 2B), except processing percentage 264 represents the percentage of times the method calls one of the methods of its child branches, whereas processing percentage 244 represents the percentage of times the method is called by the methods of its childrengraphs. Expander icon 260 indicates that a branch 252 may be further expanded to show, in addition to its own branch, and its children branches that are all of the methods of the call. Expanded indicator 266 may be essentially the same as expander icon 246 (FIG. 2B), except that each is on a different graph. Expanded indicator icon 266 appears in branches that result from the expansion of a parent branch. In the example embodiment of FIG. 2C parent branch 252D with a percentage of occurrences of 4.15% is further expanded into children branches of 252E, 252F, 252G, 252H, 252I, 252J and 252K with percentages of occurrence of 3.37%, 0.26%, 0.26%, 0.13%, 0.04%, 0.04%, 0.04% and 0.17%, respectively. The sum of the percentage occurrences of the child branches 252E to 252K (3.37%+0.26%+0.26%+0.13%+0.04%+0.04%+0.04%+0.17%) is equal to the percentage occurrence (4.15%) of the parent branch 252D.

When comparing the percentages in back trace graph 206 to the percentages in call graph 250, note that the percentages of the subranches of call graph 250 do not represent all the times that the corresponding method was called, but instead represent the only the number of times that the method of the subranch was called by the method of its parent branch. The method of that subranch may have been called many other times by other methods. Similarly, the percentages of the subranches of back trace graph 206 do not represent all the times that the corresponding method called a child method, but instead represent the only the number of times that the method of the subranch called the particular child method of its parent branch. The method of that subranch may have called many other times, calling many other methods. Consequently, the same method that is a parent branch in call graph 250 that is indicated as having been called a very high percentage of times may also appear as child branch in back trace graph 206 having called the method of its paraent branch a very low percentage of times.

The stack trace provided may be advantageous for users who encounter multi-tenant production systems software errors that are often difficult to isolate and debug. Typically, errors that are user data driven versus program code errors are particularly difficult to reproduce in an isolated test or development environment. User data driven errors may be addressed by generating a stack trace at an error location, and providing the generated stack trace information to an engineer for investigation. In addition, there may be additional information added to the stack trace to help with the analysis process.

For example, at the point a Java exception is thrown (i.e., an error is generated), an information gathering task is initiated.

System Process Space

Figure 3:
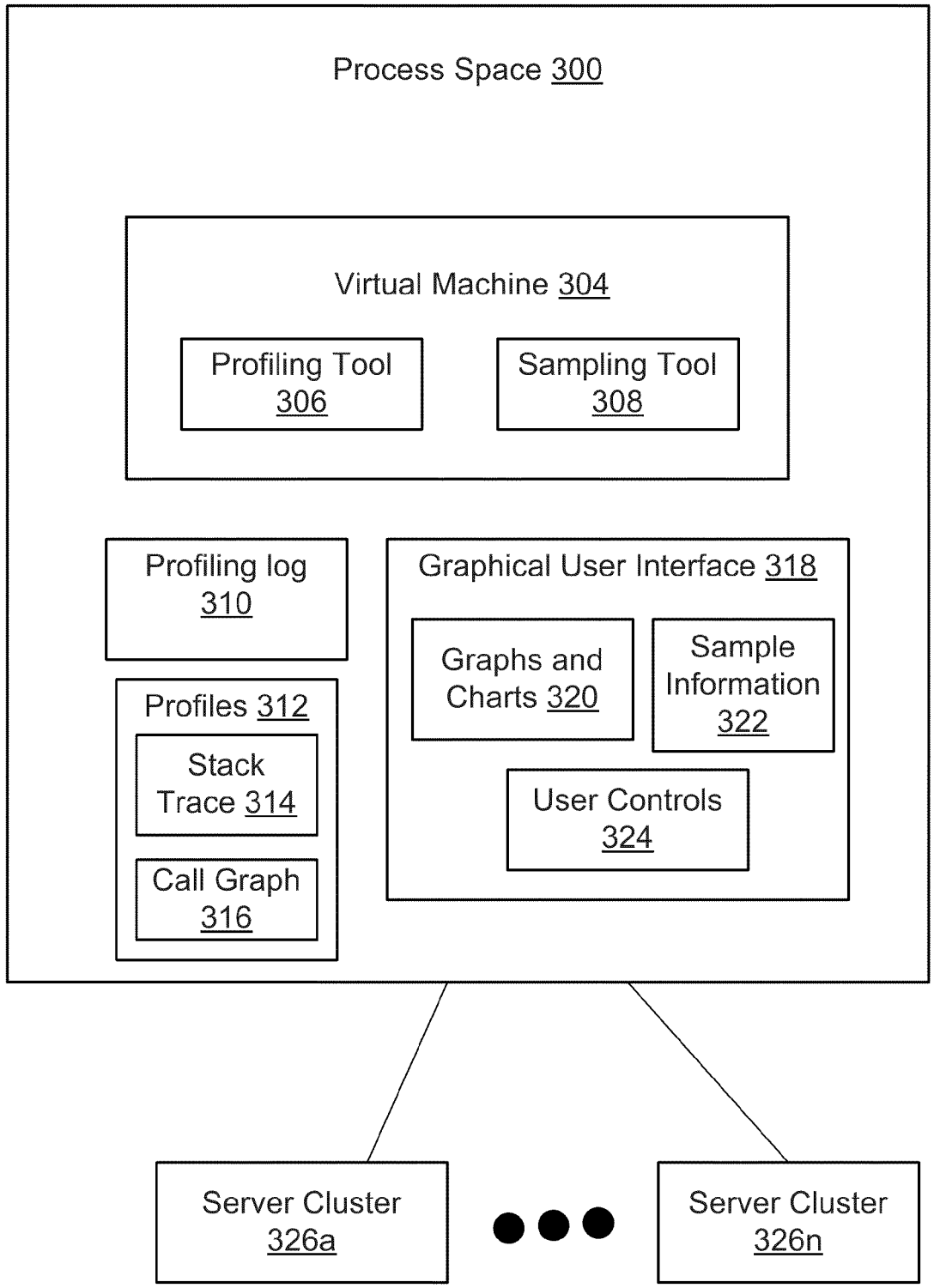
FIG. 3 shows a block diagram of an embodiment of tools for profiling in a multi-tenant database network system.

FIG. 3 shows a block diagram of an embodiment of process space 300. Process space 300 may include virtual machine (VM) 304, profiling tools 306, sampling tools 308, profiling log 310, profiles 312, stack trace 314, call graph 316, Graphical user interface (GUI) 318, graphs and charts 320, statistical information 322, user controls 324, and server clusters 326a-n. In other embodiments, tenant process space 300 may not have all of the elements listed and/or may have other elements instead of or in addition to those listed.

Process space 300 is the portion of the system where various programs for running the system reside. Virtual machine (VM) 304 is a computer intermediate language, such as a JAVA virtual machine, assembler other mechanism of translating a higher level language into machine language. Profiling tools 306 performs a performance analysis on a sample of data that was collected. For example, profiling tools 306 may convert a sample into a call graph and a back trace graph. Profiling tool 306 may also create of samples and may extract other information from a sample. Sampling tools 308 may collect samples from a cluster of servers, such as call information. Sampling tools 308 may determine which methods were called, which methods called each method, and how often each method is called. Profiling log 310 may be a log of which servers were sampled and when the server was sampled. Profiles 312 are the profiles created by profiling tools 306. Profiles 312 may include a call graph, stack trace, pie chart, and statistical information about the sample. Stack trace 314 is the stack trace that is created by profiling tools 306 based on the call graph, which is a graph of the methods that call each method. Call graph 316 is the graph of methods called by each method. Graphical user interface (GUI) 318 is the GUI presented to the user, which the user interacts with to activate profiling tools 306 and sampling tools 308. Graphs and charts 320 may include the images presented to the user to represent the call graph, back trace graph, pie chart, for example. Sample information 322 may include sample ID, expected sample time, actual sample time, number of samples, servers sampled, sample errors and/or other information about the sample. User controls 324 include buttons and links that activate the profiling tools 306 and sample tools 308. User controls 324 may include buttons and/or input fields for scheduling sampling, which may include fields for entering the frequency and duration of a sampling as well as which cluster and/or clusters to sample. Server clusters 326a-n are the clusters that are sampled and profiled.

System Overview

Figure 4:
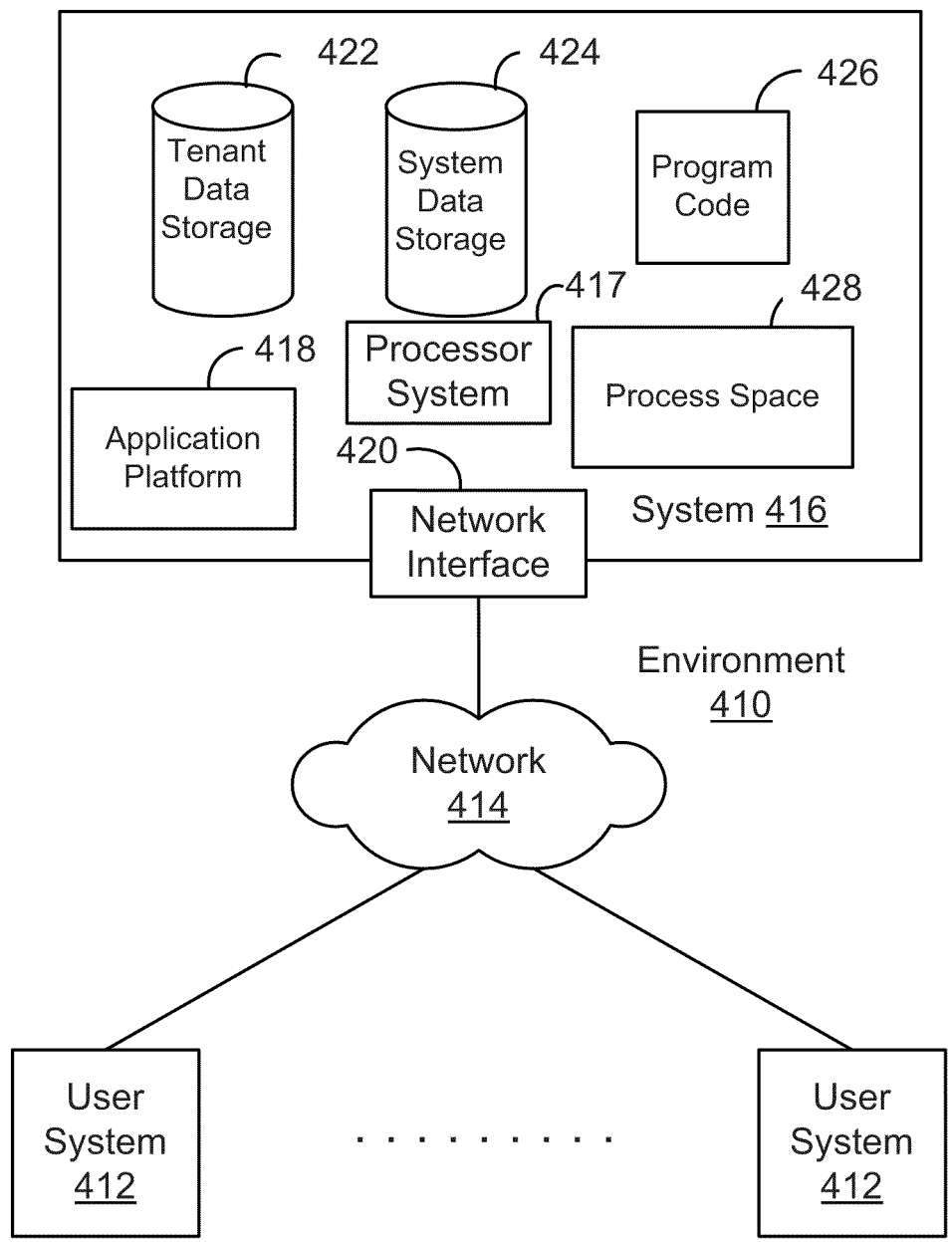
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In at least one embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain at least one embodiment, system 416 implements applications other than, or in addition to, a CRM application. For example, system 16 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
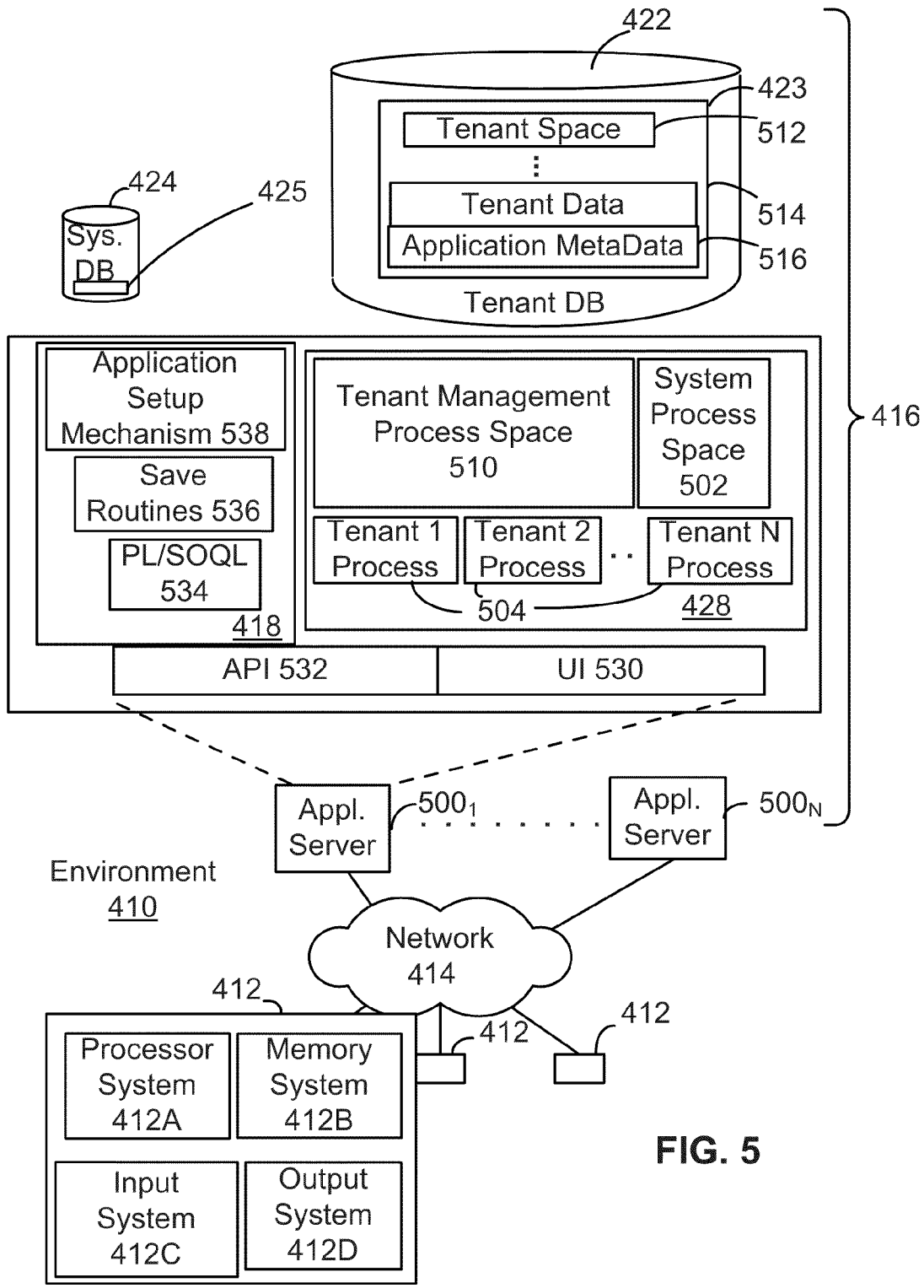
FIG. 5 illustrates a block diagram of an embodiment of elements of FIG. 4 and various possible interconnections between these elements.

One arrangement for elements of system 416 is shown in FIG. 4 and FIG. 5, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes. Process space 300 may be an embodiment of process space 428.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in at least one embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 400, an application platform 418, tenant data storage 422, and system data storage 424. Also shown is system process space 402, including individual tenant process spaces 404 and a tenant management process space 410. Each application server 1000 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain at least one embodiment, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain at least one embodiment, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database. Server cluster 326a-n may include applications servers 500₁-500ₙ. However, each server cluster 326a-n may include multiple servers.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled, CUSTOM ENTITIES AND FIELDS IN A MULTI-TENANT DATABASE SYSTEM, and which is hereby incorporated herein by reference, teaches systems and methods for creating custom objects as well as customizing standard objects in a multi-tenant database system. In certain at least one embodiment, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment of FIGS. 4 and 5

Figure 6:
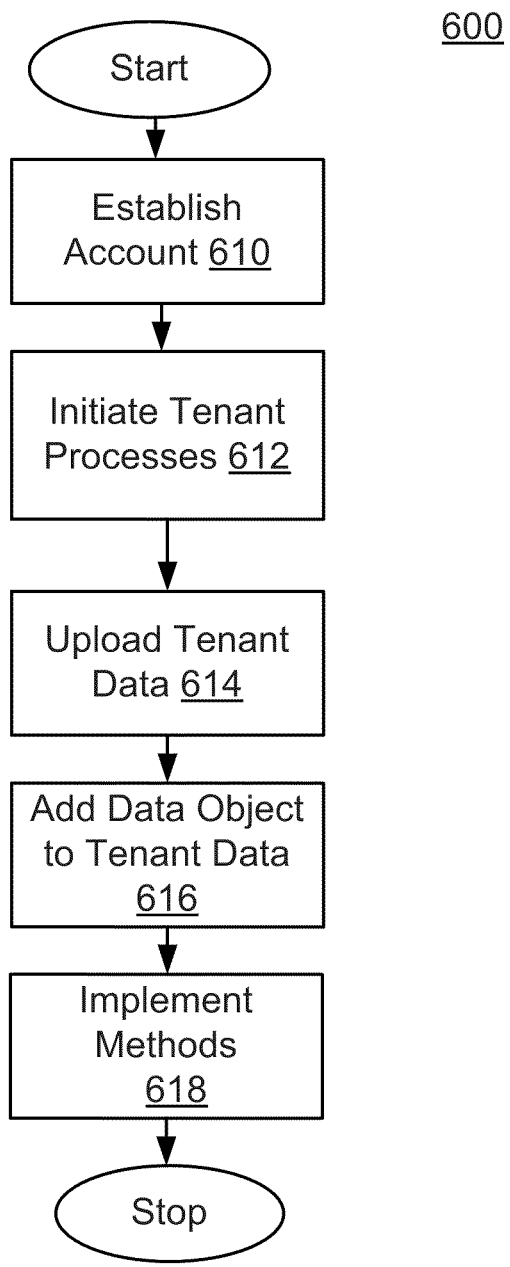
FIG. 6 illustrates a flowchart of an embodiment of a method of using the environment of FIGS. 4 and 5.

FIG. 6 shows a flowchart of an example of a method 600 of using environment 410. In step 610, user system 412 (FIGS. 4 and 5) establishes an account. In step 612, one more tenant process spaces 504 (FIG. 5) are initiated on behalf of user system 412, which may also involve setting aside space in tenant space 512 (FIG. 5) and tenant data 514 (FIG. 5) for user system 412. Step 612 may also involve modifying application metadata to accommodate user system 412. In step 614, user system 412 uploads data. In step 616, one or more data objects are added to tenant data 514 where the uploaded data is stored. In step 618, methods and the code for generating the sampling and profiling tools for large, clustered application server based cloud computing environments associated with FIGS. 4 and 5 may be implemented. The user of method 600 may represent an organization that is a tenant of system 416 (FIG. 4) or may be associated with the tenant. In at least one embodiment, each of the steps of method 600 is a distinct step. In another embodiment, although depicted as distinct steps in FIG. 6, steps 610-618 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Method for Creating the Environment of FIGS. 4 and 5

Figure 7:
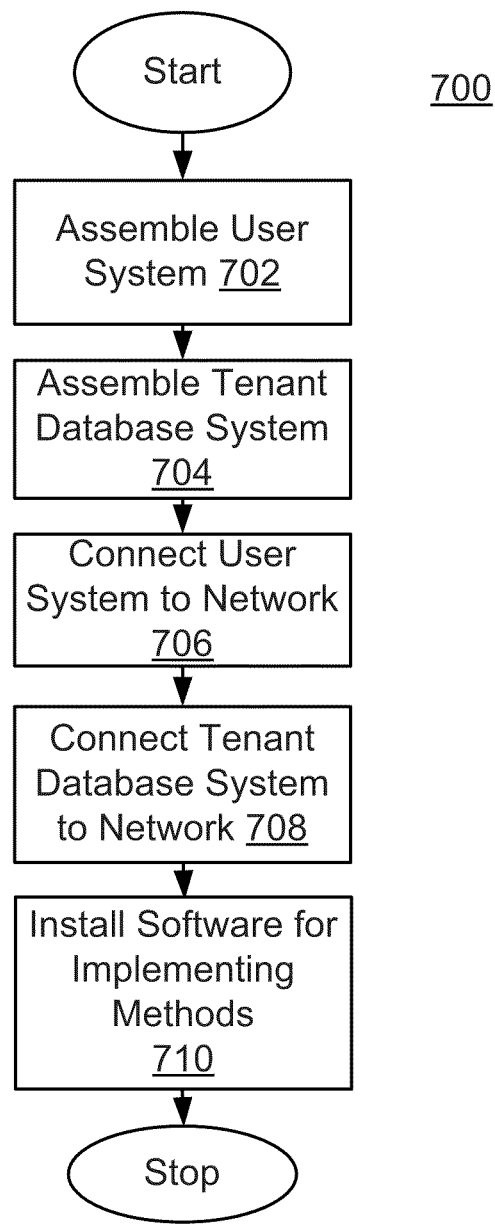
FIG. 7 illustrates a flowchart of a method of making the environment of FIGS. 4 and 5.

FIG. 7 is a method of making environment 410, in step 702, user system 412 (FIGS. 4 and 5) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 704, system 416 (FIGS. 4 and 5) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 416 may include installing application platform 418, network interface 420, tenant data storage 422, system data storage 424, system data 425, program code 426, process space 428, UI 530, API 532, PL/SOQL 534, save routine 536, application setup mechanism 538, applications servers 500₁-500ₙ, system process space 502, tenant process spaces 504, tenant management process space 510, tenant space 512, tenant data 514, and application metadata 516 (FIG. 5).

In step 706, user system 412 is communicatively coupled to network 414. In step 708, system 416 is communicatively coupled to network 414 allowing user system 412 and system 416 to communicate with one another (FIG. 4). In step 710, one or more instructions may be installed in system 416 (e.g., the instructions may be installed on one or more machine readable media, such as computer readable media, therein) and/or system 416 is otherwise configured for performing the steps of methods and generating sampling and profiling tools for large, clustered application server based cloud computing environments. For example, as part of step 710, one or more instructions may be entered into the memory of system 416 for creating sampling and profiling tools for large, clustered application server based cloud computing environments, such as multi-tenant on-demand systems. In at least one embodiment, each of the steps of method 700 is a distinct step. In another embodiment, although depicted as distinct steps in FIG. 7, steps 702-710 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

Alternatives And Extensions

In an embodiment, the results from monitoring an entire cluster or other group of servers may be presented in a format similar or identical to were the results from one server. Each embodiment disclosed herein may be used or otherwise combined with any of the other embodiments disclosed. Any element of any embodiment may be used in any embodiment.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for profiling a unit of code comprising:
    on each of a plurality of servers of a cluster of servers running at least a unit of code that is the same as is running on others of the plurality of servers, the servers including a set of one or more processors;
    sampling, by a host system having a set of one or more processors, performance information from the plurality of servers within the one or more server clusters, the sampling being performed uniformly across the plurality of servers in the cluster, the performance information being of the performance of the unit of code that is running on each of the servers of the plurality of severs, and each sample including at least a stack trace dump of each of a plurality of threads running on the server from the plurality of servers at a moment in time at which the sample was taken, the plurality of threads being a plurality of tasks running concurrently, and each stack trace dump of each thread including at least an ordered list of current methods being executed followed by a subsequent method that called the current method;
    aggregating the stack trace dumps of each thread over the samples to generate both a call graph and a back trace graph;
    generating, by the one or more processors of the host system, a performance profile characterizing performance of the unit of code running on the plurality of servers based on the sampling, the performance profile characterizes the performance of the unit of code, the performance profile includes at least a view having performance information from each server of the plurality of servers combined and formatted as one unified profile; and
    storing, by the host system, the performance profile on one or more non-transitory computer readable medium for later analysis.

2. The method of claim 1, the storing of the performance profile including at least updating a profiling log for storing the performance information from a series of profiling runs for the plurality of servers, by at least entering the performance information of a current profiling run into the profiling log, and storing the updating.

3. The method of claim 1, further comprising:
    creating a schedule for running profiles for the plurality of servers.

4. The method of claim 1, the sampling being performed at time intervals specified in a schedule that specifies how many samplings of the unit of code occur within a given time period.

5. The method of claim 1, further comprising:
    accessing configuration files of each server cluster;
    determining names of servers in a cluster, based on the configuration files accessed; and
    determining a schedule for gathering performance information about each server of the plurality of servers.

6. The method of claim 1, the sampling of plurality of servers being performed according to a round-robin sampling schedule.

7. The method of claim 1, where the sampling across the plurality of servers is load balanced by sampling in equal time sample intervals at each of the plurality of servers in the server cluster, a profiler selecting a host name from a collection of host names that includes one host name for each of the plurality of servers in the server cluster, and the profiler targeting a single server from the plurality of servers for each sample.

8. The method of claim 1, further comprising:
    selective profiling by isolating tasks of threads to a single entity;
    where the isolating is carried out by at least
        tagging each thread with an ID during sampling, and
        creating filters to run profiles on threads based on IDs resulting in selective profiling.

9. The method of claim 1, further comprising:
    providing a graphical user interface for analysis of the one or more server clusters.

10. The method of claim 9, where the graphical user interface further comprises a chart of a group of methods having a highest number of method calls listed according to percentage of method calls.

11. The method of claim 9, where the graphical user interface further comprises a user expandable call graph tree.

12. The method of claim 9, where the graphical user interface further comprises a user expandable back trace tree.

13. The method of claim 9, where the graphical user interface further comprises a pie chart of method calls to different methods, each slice of the pie representing how many method calls were made to a particular method as a percentage of a total of all method calls to all methods in the pie chart.

14. The method of claim 9, where the graphical user interface further comprises sampling information parameters.

15. The method of claim 1, the generating of the profile information being performed asynchronously with the storing of the performance information.

16. The method of claim 1, where the view is not divided according to server.

17. The method of claim 1, the unit of code including one or more machine instructions for implementing a multitenant, on demand, relational database system.

18. A non-transitory machine-readable medium carrying one or more instructions for profiling a system, which when executed cause a method to be carried out, the method comprising:

creating, by a host system, a profiling log for storing a series of profiling runs at the host system for one or more server clusters in the multi-tenant database network system;

creating, by the host system, a schedule for running profiles for the one or more server clusters;

determining, by the host system, from the schedule when a server cluster from the one or more server clusters requires a profile run;

wherein when the server cluster requires a profile run,
sampling, by the host system, a plurality of servers within the server cluster, wherein the sampling is performed uniformly across the plurality of servers in the cluster at a set interval for a set duration, each sample including at least a stack trace dump of each of a plurality of threads running on the server from the plurality of servers at a moment in time at which the sample was taken, the plurality of threads being a plurality of tasks running concurrently, and each stack trace dump of each thread including at least an ordered list of a current methods being executed followed by a subsequent method that called the current method;

aggregating the stack trace dumps of each thread over the samples to generate both a call graph and a back trace graph;

generating, by the host system, a performance profile based on sample sets formed from the sampling;

storing, by the host system, the performance profile; and retrieving, by the host system, the performance profile for analysis.

19. A computer network configured for profiling a system, the computer network comprising:

a plurality of clusters of servers each having a processor system including at least one processor; and a memory system including a machine readable medium having stored thereon one or more sequences of instructions which, when executed, cause a method to be carried out, the method comprising:

creating, by a host system, a profiling log for storing a series of profiling runs at the host system for one or more server clusters in the multi-tenant database network system;

creating, by the host system, a schedule for running profiles for the one or more server clusters;

determining, by the host system, from the schedule when a server cluster from the one or more server clusters requires a profile run;

wherein when the server cluster requires a profile run,
sampling, by the host system, a plurality of servers within the server cluster, wherein the sampling is performed uniformly across the plurality of servers in the cluster at a set interval for a set duration, each sample including at least a stack trace dump of each of a plurality of threads running on the server from the plurality of servers at a moment in time at which the sample was taken, the plurality of threads being a plurality of tasks running concurrently, and each stack trace dump of each thread including at least an ordered list of a current methods being executed followed by a subsequent method that called the current method;

aggregating the stack trace dumps of each thread over the samples to generate both a call graph and a back trace graph;

generating, by the host system, a performance profile based on sample sets formed from the sampling;

storing, by the host system, the performance profile; and retrieving, by the host system, the performance profile for analysis.

* * * * *